US011308286B2

(12) United States Patent
Jiang

(10) Patent No.: US 11,308,286 B2
(45) Date of Patent: Apr. 19, 2022

(54) METHOD AND DEVICE FOR RETELLING TEXT, SERVER, AND STORAGE MEDIUM

(71) Applicant: BEIJING BAIDU NETCOM SCIENCE AND TECHNOLOGY CO., LTD., Beijing (CN)

(72) Inventor: Shuai Jiang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 334 days.

(21) Appl. No.: 16/376,688

(22) Filed: Apr. 5, 2019

(65) Prior Publication Data

US 2019/0370341 A1 Dec. 5, 2019

(30) Foreign Application Priority Data

May 31, 2018 (CN) .......................... 201810550596.0

(51) Int. Cl.
*G06F 40/44* (2020.01)
*G06N 7/00* (2006.01)
*G06F 40/247* (2020.01)

(52) U.S. Cl.
CPC ............ *G06F 40/44* (2020.01); *G06F 40/247* (2020.01); *G06N 7/005* (2013.01)

(58) Field of Classification Search
CPC ...... G06F 40/44; G06F 40/247; G06F 40/216; G06F 40/284; G06F 40/151; G06N 7/005
See application file for complete search history.

(56) References Cited

U.S. PATENT DOCUMENTS

| 6,161,083 A * | 12/2000 | Franz .................... G06F 40/211 704/4 |
| 8,037,086 B1 * | 10/2011 | Upstill ................ G06F 16/3338 707/767 |
| 10,418,023 B2 * | 9/2019 | Jiang ..................... G10L 13/047 |
| 2004/0117352 A1 * | 6/2004 | Schabes .............. G06F 16/3344 |
| 2005/0005240 A1 * | 1/2005 | Reynar ................ G06F 40/274 715/257 |

(Continued)

FOREIGN PATENT DOCUMENTS

| JP | 2006190146 A | 7/2006 |
| JP | 2010152561 A | 7/2010 |

(Continued)

OTHER PUBLICATIONS

Japanese Patent Application No. 2019-041533 First Office Action dated May 19, 2020, 7 pages.

(Continued)

*Primary Examiner* — Abdelali Serrou
(74) *Attorney, Agent, or Firm* — Lathrop GPM LLP

(57) ABSTRACT

Embodiments of the present disclosure provide a method and a device for retelling a text, a server and a storage medium. The method includes: for each original sentence in an original text, selecting a synonymous word of each original word in the original sentence based on the synonymous words of respective original words contained in the original sentence and predetermined probabilities of different words appearing continuously; and connecting the selected synonymous words of respective original words in the original sentence sequentially to obtain a retold sentence of the original sentence.

5 Claims, 4 Drawing Sheets

(56) References Cited

U.S. PATENT DOCUMENTS

| | | | |
|---|---|---|---|
| 2005/0125215 A1* | 6/2005 | Wu | G06F 40/45 |
| | | | 704/1 |
| 2011/0161073 A1* | 6/2011 | Lesher | G06F 40/247 |
| | | | 704/10 |
| 2018/0107654 A1* | 4/2018 | Jung | G06F 40/268 |
| 2018/0181650 A1* | 6/2018 | Komatsuda | G06F 40/247 |
| 2019/0095433 A1* | 3/2019 | Lee | G06F 40/44 |
| 2019/0155877 A1* | 5/2019 | Sharma | G06F 40/253 |

FOREIGN PATENT DOCUMENTS

| | | |
|---|---|---|
| JP | 2015118395 A | 6/2015 |
| WO | WO 2017130089 A1 | 8/2017 |

OTHER PUBLICATIONS

Japanese Patent Application No. 2019-041533 English translation of First Office Action dated May 19, 2020, 6 pages.
Bakhteev, O. et al., "Author Masking using Sequence-to-Sequence Models", Sep. 2017, Retrieved from the Internet Jul. 30, 2019: URL http://ceur-ws.org/Vol-1866/paper_68.pdf; 7 pages.
Biran, Or, et al., "Putting it Simply: a Context-Aware Approach to Lexical Simplification" http://wing.comp.nus.edu.sg/~antho/P/P11/P11-2087.pdf, Proceedings of the 49th Annual Meeting of the Association for Computational Linguistics: shortpapers, 2011, pp. 496-501.
European Patent Application No. 19166961.3 extended Search and Opinion dated Aug. 6, 2019, 5 pages.

\* cited by examiner

METHOD AND DEVICE FOR RETELLING TEXT, SERVER, AND STORAGE MEDIUM

CROSS-REFERENCE TO RELATED APPLICATION

This application is based on and claims priority to Chinese Patent Application Serial No. 201810550596.0, filed on May 31, 2018, the entire contents of which are incorporated herein by reference.

FIELD

The present disclosure relates to the field of natural language processing technologies, and more particularly to a method and a device for retelling a text, to a server and a storage medium.

BACKGROUND

In the information age, data become more and more important. Therefore, it is very important to construct its own unique content resource under the background of content ecological construction, and retelling a text is an important way to construct the content resource.

At present, retelling an article is mainly achieved through manual editing. However, the manual retelling has defects of consuming massive human and financial resources, subjectivity (that is, different subjective grounds may usually influence a final result for retelling the text), limitation (that is, it is often impossible to retell all texts due to limited manpower), being complex and inefficient, and high cost and low performance. Therefore, it is necessary to provide a new method for retelling the text independent of manual work.

SUMMARY

The present disclosure provides a method and a device for retelling a text, a server and a storage medium, which reduce dependence on manual work and improve efficiency of retelling the text.

In a first aspect, embodiments of the present disclosure provide a method for retelling a text. The method includes:

for each original sentence in an original text, selecting a synonymous word of each original word in the original sentence based on synonymous words of respective original words contained in the original sentence and predetermined probabilities of different words appearing continuously; and connecting the selected synonymous words of the original words in the original sentence sequentially to obtain a retold sentence of the original sentence.

In a second aspect, embodiments of the present disclosure further provide a device for retelling a text. The device includes a processor and a memory configured to store instructions executable by the processor. The processor is configured to:

for each original sentence in an original text, select a synonymous word of each original word in the original sentence based on synonymous words of respective original words contained in the original sentence and predetermined probabilities of different words appearing continuously; and connect the selected synonymous words of the original words in the original sentence sequentially to obtain a retold sentence of the original sentence.

In a third aspect, embodiments of the present disclosure further provide a server. The server includes one or more processors and a storage device. The storage device is configured to store one or more programs. When the one or more programs are executed by the one or more processors, the one or more processors are caused to implement the method for retelling the text according to the first aspect.

In a fourth aspect, embodiments of the present disclosure further provide a storage medium having a computer program stored thereon. The computer program is configured to implement the method for retelling the text according to the first aspect when executed by a processor.

BRIEF DESCRIPTION OF THE DRAWINGS

Other features, objectives and advantages of the present disclosure will become apparent with reference to the detailed description made for non-limiting embodiments in conjunction with accompanying drawings.

DETAILED DESCRIPTION

Detailed description will be further made below to the present disclosure with reference to the accompanying drawings and the embodiments. It should be understood that, detailed embodiments described herein are intended only to explain the present disclosure, and are not intended to limit the present disclosure. In addition, it should be further noted that, for the convenience of description, only some contents but not all of the structure related to the present disclosure are illustrated in the accompanying drawings.

Embodiment 1

Figure 1:
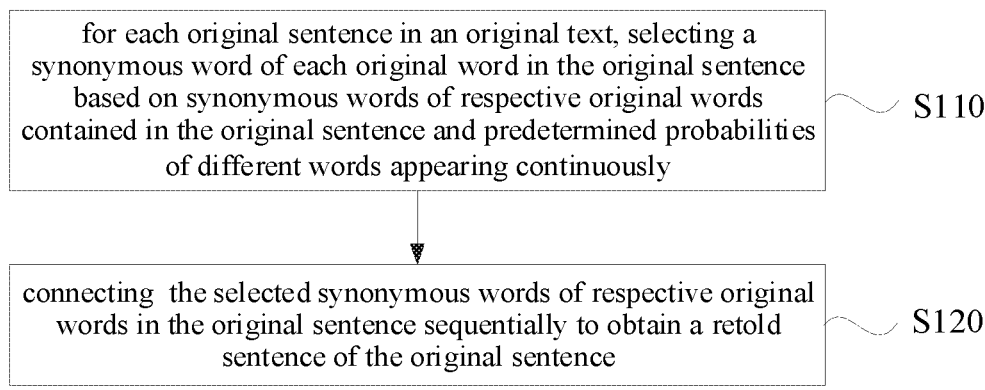
FIG. 1 is a flow chart illustrating a method for retelling a text provided in Embodiment 1 of the present disclosure.

FIG. 1 is a flow chart illustrating a method for retelling a text provided in Embodiment 1 of the present disclosure. This embodiment may be applicable to an AGC (Algorithm Generated Content) project for performing text retelling on original network data. The method may be executed by a device for retelling a text provided by embodiments of the present disclosure. The device may be implemented in form of software and/or hardware. Referring to FIG. 1, the method includes following blocks in detail.

At block S110, for each original sentence in an original text, a synonymous word of each original word in the original sentence is selected based on synonymous words of respective original words contained in the original sentence and predetermined probabilities of different words appearing continuously.

The synonymous word refers to a word having same meaning as indicated by the original word. One original word may correspond to at least one synonymous words. For example, a word bank of command words and corresponding synonymous words may be established in advance. After performing processing such as splitting a sentence and splitting a word on the original sentence to obtain respective original words contained in the original sentence, respective original words are input into the word bank in turn, and then matched to obtain the synonymous words corresponding to each original word. It may further be that, lots of common words are input to a neural network model in advance for training, thereby determining a synonymous word determining model, and when respective original words contained in the original sentence are input to the synonymous word determining model in turn, the synonymous words corresponding to each original word may be obtained.

The predetermined probability of different words appearing continuously refer to a probability that two or more neighboring words occur simultaneously, which may be obtained by mass sample file statistics, and may be persistently stored in a pre-set local file. For example, when the probability of two or more words appearing continuously needs to be determined, the corresponding words may be directly input to the pre-set local file for searching, thus obtaining the probability of corresponding words appearing continuously.

In detail, after determining the synonymous words of respective original words contained in the original sentence, the probabilities of the synonymous words of respective original words that occur continuously may be determined based on the predetermined probabilities of different words appearing continuously, and ranked in a descending order. A preset number of synonymous words with highest probabilities are selected as candidate synonymous words, and then an intersection operation is performed on the selected candidate synonymous words of respective original words based on sentence coherence, semantics, and the like, thus uniquely determining the synonymous word of each original word in the original sentence.

For example, selecting the synonymous word of each original word in the original sentence based on synonymous words of respective original words contained in the original sentence and the predetermined probabilities of different words appearing continuously may include: determining a probability in which a current synonymous word of a current original word in the original sentence and any of following synonymous words of a following original word in the original sentence appear continuously, based on the predetermined probabilities of different words appearing continuously; selecting the synonymous word of the following original word based on the probability in which the current synonymous word and the following synonymous word appear continuously.

The following original word refers to an original word following the current original word in the original sentence. There may be one or more following original word for the current original word. For example, the first original word following the current original word may be regarded as the following original word, and both the first original word following the current original word and the second original word following the current original word may be regarded as the following original words of the current original word.

Taking that an original sentence is ABCDE, A is the current original word, and B is the following original word as an example, a procedure for determining the synonymous word may be as follows. The synonymous word of A (i.e., the current synonymous word) is a1. Correspondingly, B is the following original word. After B is input to the word bank of command words and corresponding synonymous words established in advance, the obtained synonymous words of B include b1, b2, b3, b4 and b5. a1b1, a1b2, a1b3, a1b4 and a1b5 are respectively input to the pre-set local file for storing the probabilities of different words appearing continuously, and the corresponding probabilities of synonymous words appearing continuously are output. The synonymous word of B corresponding to the highest probability, such as b1, may be determined as the synonymous word of B. For example, to ensure coherence of a retold sentence obtained subsequently, a preset number of synonymous words of B (for example, 3 synonymous words) may be selected as candidate synonymous words of B, and then the synonymous word of B may be uniquely determined based on the sentence coherence, semantics, and the like.

At block S120, the selected synonymous words of respective original words in the original sentence are sequentially connected to obtain a retold sentence of the original sentence.

The retold sentence refers to a sentence having the same meaning with the original sentence, and is a replaced sentence of the original sentence.

In detail, when not a unique synonymous word is selected for each original word, a plurality of retold sentences of the original sentence are obtained. Moreover, the retold sentence may be selected as follows. The intersection operation is performed on the selected synonymous words of respective original words based on the sentence coherence, semantics, and the like, thus uniquely determining the synonymous word of each original word in the original sentence. The synonymous words of respective original words are sequentially connected based on a connecting sequence of respective original words in the original sentence, to obtain the retold sentence of the original sentence. If the selected synonymous word of each original word is unique, the synonymous words of respective original words are sequentially connected directly based on the connecting sequence of respective original words in the original sentence, to obtain the retold sentence of the original sentence.

With the method for retelling the text provided by embodiments of the present disclosure, for each original sentence in the original text on which the text retelling is to be performed, the synonymous word of each original word in the original sentence is selected based on synonymous words of respective original words contained in the original sentence and predetermined probabilities of different words appearing continuously, and the selected synonymous words of the original words in the original sentence are connected sequentially, to obtain the retold sentence of the original sentence. The method reduces the dependency on manual work and improves an efficiency of retelling the text while avoiding a copyright risk.

Embodiment 2

Figure 2A:
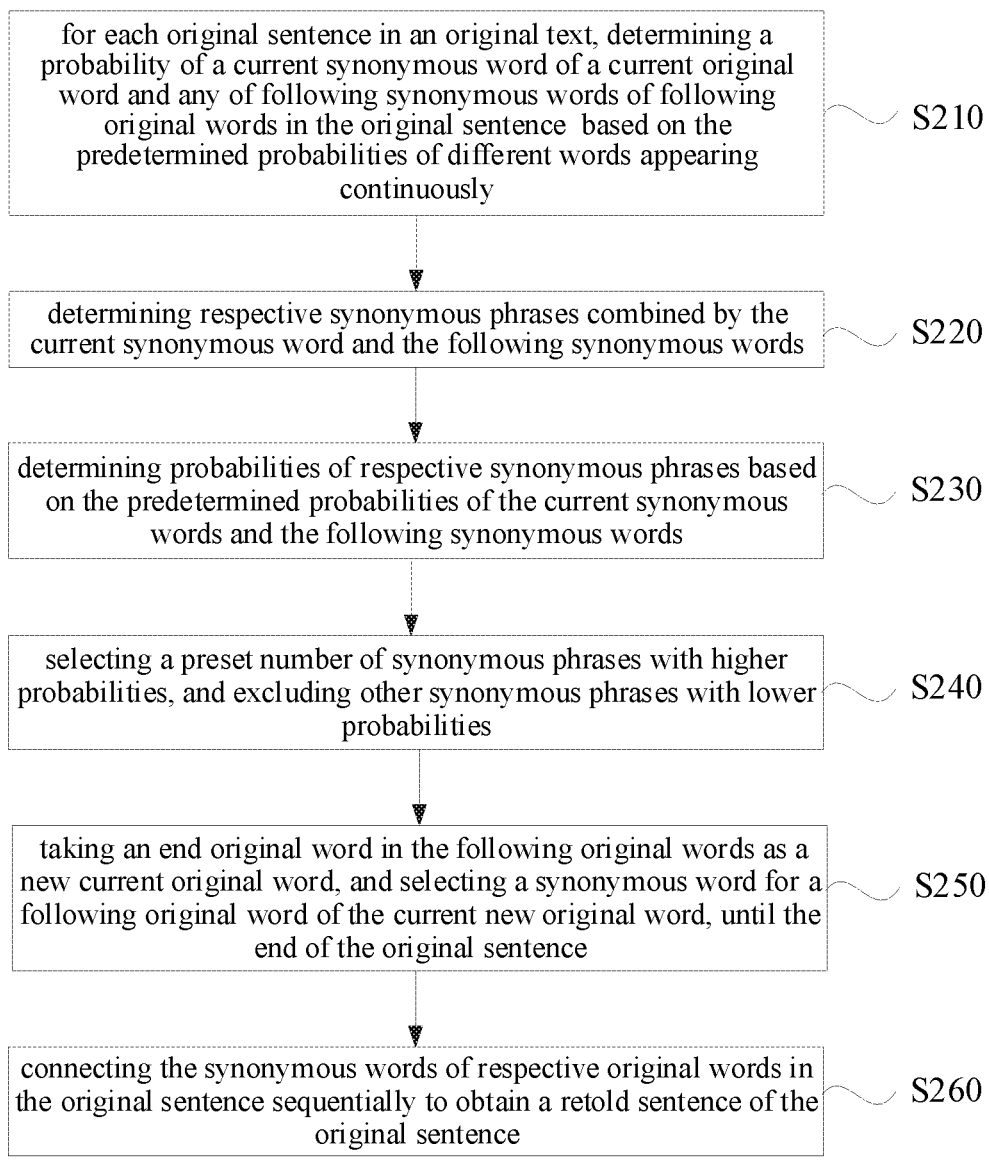
FIG. 2A is a flow chart illustrating a method for retelling a text provided in Embodiment 2 of the present disclosure.

FIG. 2A is a flow chart illustrating a method for retelling a text provided in Embodiment 2 of the present disclosure. The method is further optimized on the basis of Embodiment 1. Referring FIG. 2, the method may include following blocks.

At block S210, for each original sentence in an original text, probabilities of any of current synonymous words of a current original word and any of following synonymous words of following original words in the original sentence appearing continuously are determined based on predetermined probabilities of different words appearing continuously.

At block S220, respective synonymous phrases combined by the current synonymous words and the following synonymous words are determined.

The synonym phrase is combined by two or more synonymous words.

For example, if the original sentence is xyz, synonymous words corresponding to x are {x0, x1, x2}, synonymous words corresponding toy are y0, y1, y2, y3, and synonymous words corresponding to z are z0, z1. The current original word is x, and the corresponding following word is y. Alternatively, taking 2 words as a window, respective synonym phrases combined by the current synonymous words and the following synonymous words may be (x0, y0), (x0, y1), (x0, y2), (x0, y3), (x1, y0) . . . and (x2, y3). It should be noted that, the number of words contained in the synonym phrase has a positive correlation with the window, which may be corrected based on an actual condition such as a complexity of the original sentence.

At block S230, probabilities of respective synonymous phrases are determined based on the probabilities of any of the current synonymous words and any of the following synonymous words appearing continuously.

The probability of the synonymous phrase refers to a probability that two or more synonymous words occur continuously. In detail, respective synonymous phrases are sequentially input to the pre-set local file for storing probabilities of different words appearing continuously, and the probabilities of respective synonymous phrases are output. For example, probabilities of (x0, y0), (x0, y1), (x0, y2), (x0, y3), (x1, y0), . . . and (x2, y3) are output and ranked in a descending order.

At block S240, a preset number of synonymous phrases with higher probabilities are selected, and other synonymous phrases with lower probabilities are excluded.

The preset number refers to a reference value provided in advance, which may be corrected based on the number of combined synonymous phrases and the probabilities of respective synonymous phrases.

In detail, respective synonymous phrases are ranked in the descending order based on the determined probabilities, and the top ranking preset number of synonymous phrases are selected as candidate synonymous phrases. For example, if there are two or more synonymous phrases have the same probability, the corresponding synonymous phrases may be ranked in parallel as one or more of the preset number of candidate synonymous phrases.

At block S250, the end original word in the following original words is taken as a new current original word, and the synonymous word is selected fora following original word of the new current original word, until the end of the original sentence.

The end original word refers to a word belonging to the following original words and located at the end position of the following original word. Illustration is made by taking that the original sentence is ABCDE as an example. Taking three words as a window, if the current original word is A, the corresponding following original words are BC, the end original word in the following original words is C. Taking C as a new current original word, the corresponding new following original words are DE.

For example, if two words are taken as a window, the end original word in the following original word is the following original word itself. In detail, taking the original sentence xyz cited above as example to illustrate, if the current original word is x, and the corresponding following original word is only y, the end original word in the following original word is y. Taking y as a new current original word, a synonymous word is selected for a new following original word z. Based on this process, the synonymous word is selected for the new following original word one by one until the original sentence is processed completely.

Figure 2B:
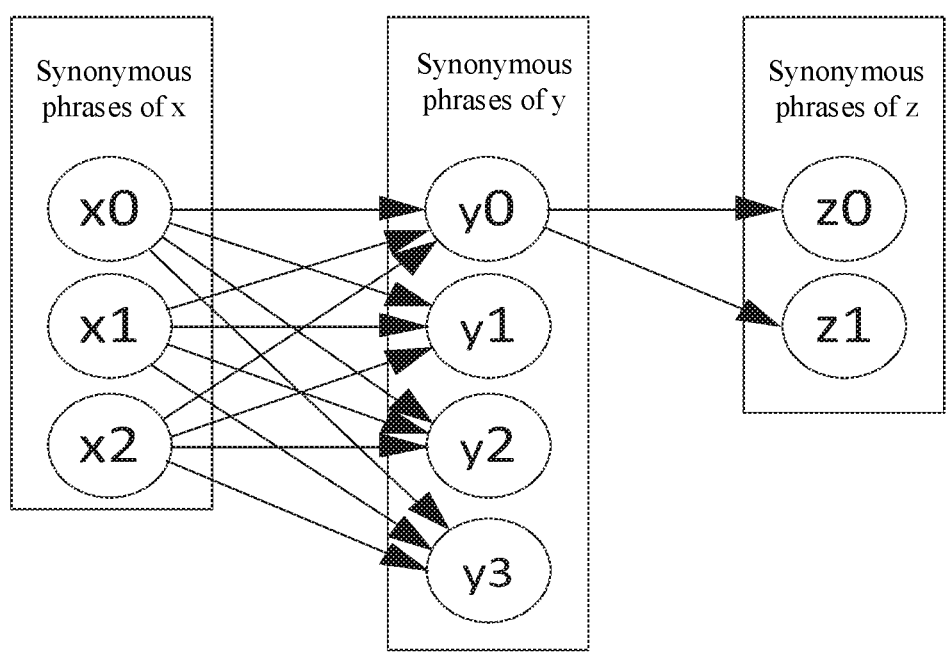
FIG. 2B is a schematic diagram illustrating an architecture for retelling a text provided in Embodiment 2 of the present disclosure.

For example, referring to FIG. 2B, taking that the original sentence xyz cited above as an example, if the current original word is x, and the corresponding following original word is y, then the first three synonymous phrases with highest probabilities are selected from respective synonymous phrases combined by the current synonymous words and the following synonymous words as the candidate synonymous phrases. If the selected first three synonymous phrases are (x0, y0), (x1, y0) and (x2, y0), the selected corresponding synonymous word of y is y0. Correspondingly, y is taken as the new current original word, z is taken as the new following original word, and respective synonymous phrases combined by synonymous words of y and synonymous words of z are (y0, z0) and (y0, z1). Likewise, the first three synonymous phrases with the highest probabilities are selected from synonym phrases combined by the synonymous words of y and the synonymous words of z as the candidate synonymous phrases, that is, (y0, z0) and (y0, z1).

At block S260, the selected synonymous words of respective original words in the original sentence are sequentially connected to obtain a retold sentence of the original sentence.

For example, the sentence combined by respective synonymous phrases having the highest score is taken as the final retold sentence. For example, respective synonymous phrases selected for the original sentence xyz cited above are respectively (x0, y0), (y0, z0) and (y0, z1), and respective synonym phrases are sequentially connected to obtain two retold sentences x0y0z0 and x0y0z1. A comprehensive score is calculated for each retold sentence based on sentence coherence, semantics, usage habits, probabilities of respective synonym phrases and the like, and finally a unique retold sentence corresponding to the original sentence is determined.

With the method for retelling the text provided by embodiments of the present disclosure, for each original sentence in the original text on which the text retelling is to be performed, the synonymous word of each original word in the original sentence is selected based on the synonymous words of respective original words contained in the original sentence and predetermined probabilities of different words appearing continuously by taking the synonymous phrase combined by two synonymous words as a unit, and the sentence combined respective synonymous phrases having the highest score is taken as the final retold sentence, thereby obtaining the retold text of the original sentence. The method reduces the dependency on manual work and improves the efficiency of retelling the text while avoiding a copyright risk.

Embodiment 3

Figure 3:
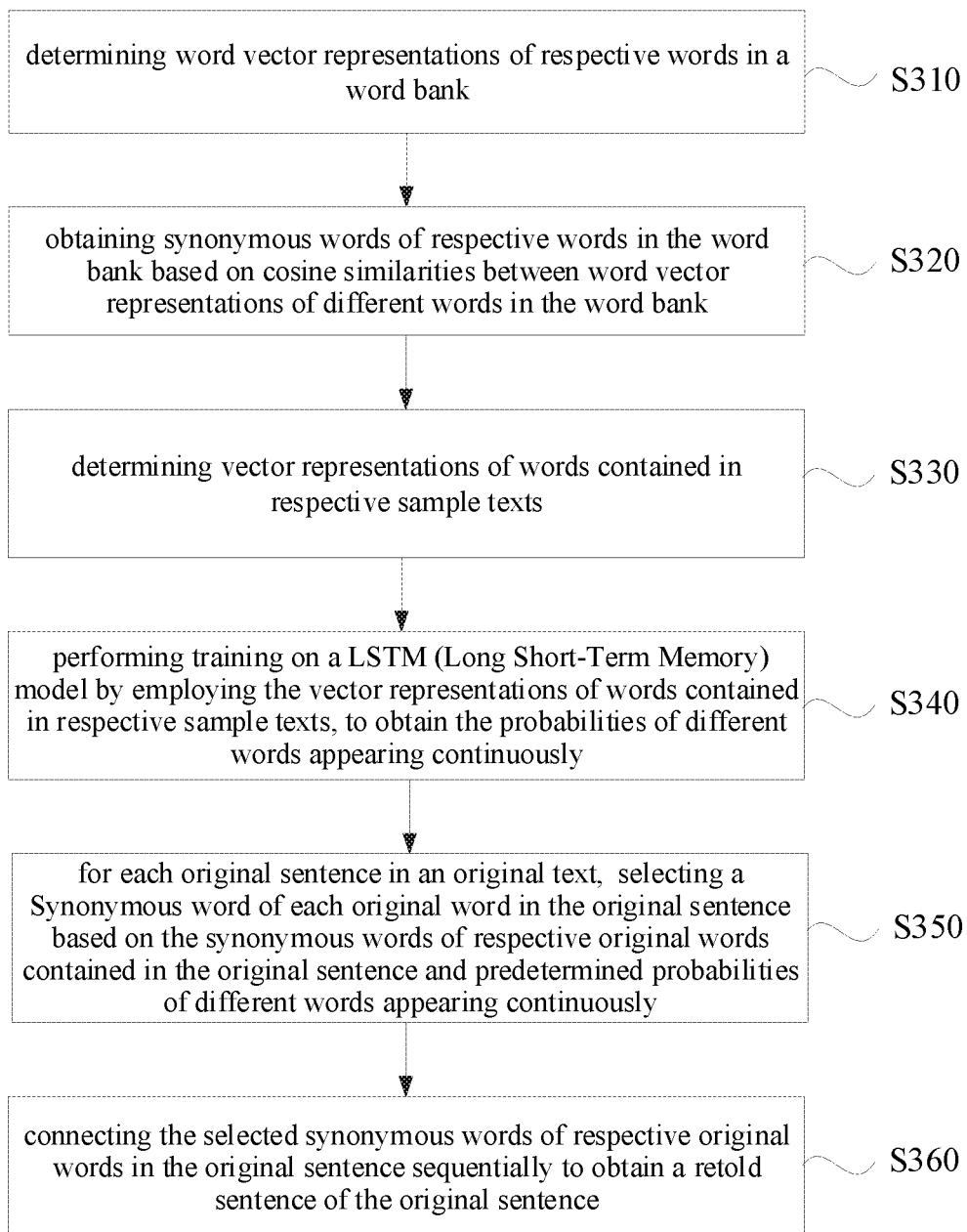
FIG. 3 is a flow chart illustrating a method for retelling a text provided in Embodiment 3 of the present disclosure.

FIG. 3 is a flow chart illustrating a method for retelling a text provided in Embodiment 3 of the present disclosure. The method is further optimized on the basis of embodiments of the present disclosure. Referring to FIG. 3, the method may include following blocks.

At block S310, word vector representations of respective words in a word bank are determined.

The word vector representation of a word refers to a representation of a word in vector space, which may be obtained by modeling the language. For example, each word is mapped to a K-dimension real number vector by training and using a text depth representation model word2vector, in which, K is generally a hyperparameter in the model.

In detail, first, a mass of encyclopedia entry data is obtained as a corpus, and processing including splitting a sentence and splitting a word is performed on all the data; then, word frequencies of all the words are counted, and the first 200,000 words with highest frequencies are used to establish a common word bank; for each word in the common word bank, a 300-diemension word vector is constructed, and an initialization is performed on each dimension in each word vector by taking random 0-1; initialized word vectors obtained by performing the initialization are input to the word2vector for training, to obtain word vectors of 200,000 words. In the procedure, a hidden layer is actually equivalent to a look-up table, multiplying the initialized word vectors obtained by performing the initialization with a hidden layer weight matrix is actually taking a specific row of the weight matrix, and the output is a word vector of the input word.

At block S320, synonymous words of respective words in the word bank are obtained based on cosine similarities between word vector representations of different words in the word bank.

The cosine similarity refers to a cosine value of an angle between two vectors in the vector space, which is used for measuring a difference between two individuals. For example, the lager the cosine value is, the smaller the angle is, and the more similar the two individuals are.

In detail, the cosine similarity between each two of the obtained word vectors of 200,000 words is calculated, and the corresponding synonymous words of respective words may be obtained. Since each word corresponds to at least one synonymous word, the synonymous words of each word may also be called as a synonymous phrase.

In addition, the semantic similarity between words may also be determined by calculating the Euclidean distance. The larger the distance is, the smaller the similarity is.

At block S330, vector representations of words contained in respective sample texts are determined.

Respective sample texts may be derived from the mass of encyclopedia entry data, and may also be article data obtained in other ways.

In detail, first, 200,000 article data is obtained, and processing including splitting a sentence, splitting a word and a blank connection between words is performed on all the article data; then, the common word bank including 200,000 common words obtained in advance is compared with words in all the articles, to determine non-common words, in which, the non-common words are replaced by <unk>, and digits in the sentence are replaced by N; for the words in all the article data, the word2vector is used for training to obtain the vector representations of words contained in all the article data.

At block S340, training is performed on a LSTM (Long Short-Term Memory) model by using the vector representations of words contained in respective sample texts, to obtain the probabilities of different words appearing continuously.

The LSTM model is a special RNN (Recurrent Neural Network) model, which is proposed for solving a problem of gradient dispersion of the RNN model, and may compress the input vector representations and predict the output.

In detail, the determined vector representations of the words contained in respective sample texts are input to the LSTM model for training, and the probabilities of respective words appearing continuously are output and persistently stored in the pre-set local filed.

At block S350, for each original sentence in an original text, the synonymous word of each original word in the original sentence is selected based on the synonymous words of respective original words contained in the original sentence and the predetermined probabilities of different words appearing continuously.

At block S360, the selected synonymous words of respective original words in the original sentence are sequentially connected to obtain a retold sentence of the original sentence.

It should be noted that, in this embodiment, there is no sequential order between the blocks S310 and S320 for determining the synonymous words of respective words in the word bank and the blocks S330 and S340 for obtaining the probabilities of different words appearing continuously. The sequence may be as given in this embodiment, or the sequence may also be that the blocks S310 and S340 corresponding to obtaining the probabilities of different words appearing continuously are executed first, and then the blocks S310 and S330 corresponding to determining the synonymous words of respective words in the word bank are executed, or the sequence may also be that the two procedures are executed simultaneously.

With the method for retelling the text provided by embodiments of the present disclosure, first, the word vector representations of respective words in the word bank are determined by employing the word2vector, the synonymous words of respective words in the word bank are obtained based on the cosine similarities, and the probabilities of different words appearing continuously are obtained by using the LSTM model; then, for each original sentence in the original text on which text retelling is to be performed, the synonymous word of each original word in the original sentence is selected based on the synonymous words of respective original words contained in the original sentence and the predetermined probabilities of different words appearing continuously, and the selected synonymous words of respective original words are sequentially connected, thereby obtaining the retold sentence of the original sentence. The method reduces the dependency on manual work and improves the efficiency of retelling the text while avoiding a copyright risk.

Embodiment 4

Figure 4:
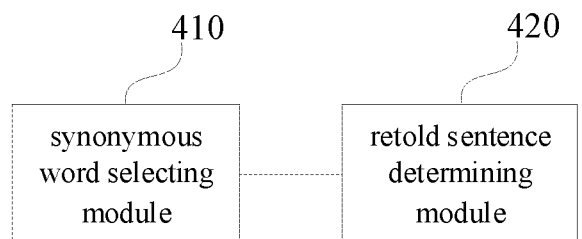
FIG. 4 is a block diagram illustrating a device for retelling a text provided in Embodiment 4 of the present disclosure.

FIG. 4 is a block diagram illustrating a device for retelling a text provided in Embodiment 4 of the present disclosure. This device may execute a method for retelling a text provided by any embodiment of the present disclosure, and have corresponding function modules for executing the method and beneficial effect. As illustrated in FIG. 4, the device may include a synonymous word selecting module 410 and a retold sentence determining module 420.

The synonymous word selecting module 410 is configured to, for each original sentence in an original text, select a synonymous word of each original word in the original sentence based on synonymous words of respective original words contained in the original sentence and predetermined probabilities of different words appearing continuously.

The retold sentence determining module 420 is configured to sequentially connect the selected synonymous words of respective original words in the original sentence to obtain a retold sentence of the original sentence.

With the device for retelling the text provided by embodiments of the present disclosure, for each original sentence in the original text on which text retelling is to be performed, the synonymous word of each original word in the original sentence is selected based on the synonymous words of respective original words contained in the original sentence and the predetermined probabilities of different words appearing continuously, and the selected synonymous words of respective original words are sequentially connected, thereby obtaining the retold sentence of the original sentence. The method reduces the dependency on manual work and improves the efficiency of retelling the text while avoiding a copyright risk.

Alternatively, the synonymous word selecting module 410 may include a probability determining unit and a synonymous word selecting unit.

The probability determining unit is configured to determine a probability in which a current synonymous word of a current original word in the original sentence and any of following synonymous words of a following original word in the original sentence appear continuously, based on the predetermined probabilities of different words appearing continuously.

The synonymous word selecting unit is configured to select the synonymous word of the following original word based on the probability in which the current synonymous word and the following synonymous word appear continuously.

For example, the synonymous word selecting unit may be specifically configured to: determine a plurality of synonymous phrases combined by the current synonymous word and the following synonymous words; determine a probability of the synonymous phrase based on the probability in which the current synonymous word and the following synonymous word appear continuously; and select a preset number of synonymous phrases with higher probabilities, and exclude other synonymous phrases with lower probabilities.

For example, the synonymous word selecting module 410 may be further configured to: take an end original word in the following original word as a new current original word, and select the synonymous word of a following original word of the new current original word, until an end of the original sentence.

Alternatively, the device may further include a word vector representation determining module and a probability determining module.

The word vector representation determining module is configured to determine vector representations of words contained in respective sample texts before selecting the synonymous word of each original word in the original sentence based on synonymous words of respective original words contained in the original sentence and the predetermined probabilities of different words appearing continuously.

The probability determining module is configured to perform training on a Long Short-Term Memory model by using the vector representations of words contained in respective sample texts, to obtain the predetermined probabilities of different words appearing continuously.

For example, the device may further include a word vector representation determining module and a synonymous word determining module.

The word vector representation determining module is configured to determine word vector representations of respective words in a word bank before selecting the synonymous word of each original word in the original sentence based on synonymous words of respective original words contained in the original sentence and the predetermined probabilities of different words appearing continuously.

The synonymous word determining module is configured to obtain the synonymous words of the respective words in the word bank based on cosine similarities between word vector representations of different words in the word bank.

Embodiment 5

Figure 5:
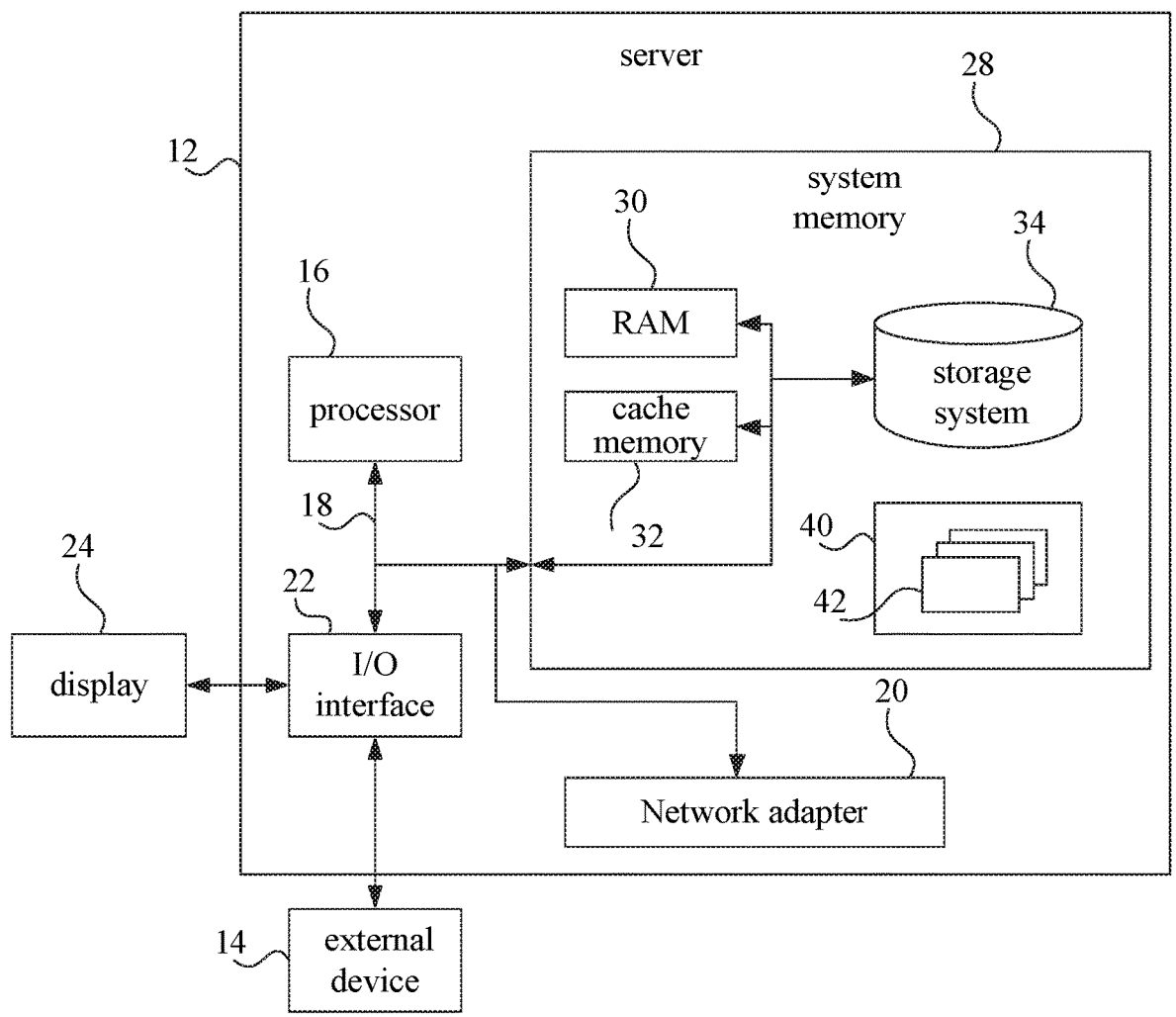
FIG. 5 is a schematic diagram illustrating a server provided in Embodiment 5 of the present disclosure.

FIG. 5 is a schematic diagram illustrating a server provided in Embodiment 5 of the present disclosure. FIG. 5 illustrates a block diagram of an exemplary server 12 applicable to implement embodiments of the present disclosure. The server 12 illustrated in FIG. 5 is only an example, which may not bring any limitation to functions and scope of embodiments of the present disclosure.

As illustrated in FIG. 5, the server 12 is embodied in the form of a general-purpose computer device. Components of the server 12 may include but not limited to: one or more processors or processing units 16, a system memory 28, and a bus 18 connecting different system components (including the system memory 28 and the processing unit 16).

The bus 18 represents one or more of several bus structures, including a storage bus or a storage controller, a peripheral bus, an accelerated graphics port and a processor or a local bus with any bus structure in the plurality of bus structures. For example, these architectures include but not limited to an ISA (Industry Standard Architecture) bus, a MAC (Micro Channel Architecture) bus, an enhanced ISA bus, a VESA (Video Electronics Standards Association) local bus and a PCI (Peripheral Component Interconnection) bus.

The server 12 typically includes various computer system readable mediums. These mediums may be any usable medium that may be accessed by the server 12, including volatile and non-volatile mediums, removable and non-removable mediums.

The system memory 28 may include computer system readable mediums in the form of volatile medium, such as a RAM (Random Access Memory) 30 and/or a cache memory 32. The server 12 may further include other removable/non-removable, volatile/non-volatile computer system storage mediums. Only as an example, the storage system 34 may be configured to read from and write to non-removable, non-volatile magnetic mediums (not illustrated in FIG. 5, and usually called "a hard disk driver"). Although not illustrated in FIG. 5, a magnetic disk driver configured to read from and write to the removable non-volatile magnetic disc (such as "a diskette"), and an optical disc driver configured to read from and write to a removable non-volatile optical disc (such as a CD-ROM, a DVD-ROM or other optical mediums) may be provided. Under these circumstances, each driver may be connected with the bus 18 by one or more data medium interfaces. The system memory 28 may include at least one program product. The program product has a set of program modules (for example, at least one program module), and these program modules are configured to execute functions of respective embodiments of the present disclosure.

A program/utility tool 40, having a set (at least one) of program modules 42, may be stored in the system memory 28. Such program modules 42 include but not limited to an operating system, one or more application programs, other program modules, and program data. Each or any combination of these examples may include an implementation of a networking environment. The program module 42 usually executes functions and/or methods described in embodiments of the present disclosure.

The server 12 may communicate with one or more external devices 14 (such as a keyboard, a pointing device, and a display 24), may further communicate with one or more devices enabling a user to interact with the device, and/or may communicate with any device (such as a network card, and a modem) enabling the server 12 to communicate with one or more other computer devices. Such communication may occur via an Input/Output (I/O) interface 22. Moreover, the server 12 may further communicate with one or more networks (such as LAN (Local Area Network), WAN (Wide Area Network) and/or public network, such as Internet) via a network adapter 20. As illustrated in FIG. 5, the network adapter 20 communicates with other modules of the server 12 via the bus 18. It should be understood that, although not illustrated in FIG. 7, other hardware and/or software modules may be used in combination with the server 12, including but not limited to: microcode, device drivers, redundant processing units, external disk drive arrays, RAID (Redundant Array of Independent Disks) systems, tape drives, and data backup storage systems, etc.

The processor 16, by operating programs stored in the system memory 28, executes various function applications and data processing, for example implements a method for retelling a text provided in embodiments of the present disclosure.

Embodiment 6

Embodiment 6 of the present disclosure provides a storage medium stored thereon with a computer program. When executed by a processor, the computer program is configured to implement a method for retelling a text according to any of embodiments described above.

The computer storage medium in embodiments of the present disclosure may employ any combination of one or more computer readable mediums. The computer readable medium may be a computer readable signal medium or a computer readable storage medium. The computer readable storage medium may be, for example, but not limited to an electronic, magnetic, optical, electromagnetic, infrared, or semiconductor system, apparatus or device, or any suitable combination of the foregoing. More specific examples (a non-exhaustive list) of the computer-readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any appropriate combination of the foregoing. In this document, the computer readable storage medium can be any tangible medium that contains or stores a program. The program can be used by or in conjunction with an instruction execution system, apparatus or device.

The computer readable signal medium may include a data signal transmitted in the baseband or as part of a carrier, in which computer readable program codes are carried. The transmitted data signal may employ a plurality of forms, including but not limited to an electromagnetic signal, a light signal or any suitable combination thereof. The computer readable signal medium may further be any computer readable medium other than the computer readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing operations of the present disclosure may be programmed using one or more programming languages or the combination thereof. The programming languages include object-oriented programming languages, such as Java, Smalltalk, C++, and further include conventional procedural programming languages, such as the C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network (LAN) or a wide area network (WAN), or may be connected to an external computer (for example, through the Internet using an Internet Service Provider).

The serial numbers of the above embodiments are only for the purpose of description and do not represent the advantages and disadvantages of the embodiments.

Those skilled in the art should understand that, respective modules or respective steps of the above embodiments may be implemented by using a common computing device. Respective modules or respective steps may be integrated on a single computing device, or distributed in the network combined by a plurality of computing devices. Alternatively, respective modules or respective steps may be implemented by using executable program codes of the computing device, such that respective modules or respective steps may be stored in the computing device to be executed by the computing device, or respectively made into respective integrated circuit modules, or a plurality of blocks or steps of respective modules or respective steps are made into a single integrated circuit module to implement. In the way, the present disclosure is not limited to any combination of any specific hardware and software.

Respective embodiments in the specification are described by employing a progressive way. An emphasis illustrated by each embodiment is different from other embodiments. The same or similar part among respective embodiments may refer to each other.

The above is only an optimal embodiment of the present disclosure, but the protection scope of the present disclosure is not limited to this. It should be understood by the skilled in the art that, the present disclosure may have any modifications and variations. Any changes, alternatives and modifications made within spirit and principles of the present disclosure should be contained in the protection scope of the present disclosure.

What is claimed is:

1. A computer-implemented method for retelling a text, comprising:
   for each original sentence in an original text, performing processing on the original sentence to obtain respective original words contained in the original sentence, and inputting sequentially each original word into a synonymous word bank or a synonymous word determining model that has been established in advance, to obtain one or more synonymous words corresponding to each original word;
   selecting a preset number of synonymous words from the one or more synonymous words corresponding to each original word based on predetermined probabilities of different words appearing continuously, comprising:

determining respective synonymous phrases consisting of current synonymous words for a current original word and following synonymous words for a following original word in the original sentence, the following original word referring to an original word following the current original word in the original sentence;

inputting sequentially the respective synonymous phrases to a pre-set file for storing the probabilities of different words appearing continuously, to determine a probability of the respective synonymous phrases, the probability of different words appearing continuously being a probability that two or more neighboring words occur simultaneously, the probability of different words appearing continuously being obtained by mass sample file statistics and persistently stored in the pre-set file, and the probability of the synonymous phrase referring to a probability that two or more synonymous words occur continuously; and selecting the preset number of synonymous phrases with higher probabilities, and excluding other synonymous phrases with lower probabilities;

taking an end original word in the following original words as a new current original word, and repeating the step of selecting the synonymous words for a new following original word of the new current original word, until the end of the original sentence, the end original word referring to a word belonging to the following original word and located at the end position of the following original word;

connecting the selected synonymous phrases sequentially to obtain a retold sentence of the original sentence;

wherein connecting the selected synonymous phrases sequentially to obtain a retold sentence of the original sentence comprises:

performing an intersection operation on the selected synonymous words of respective original words based on one or more of sentence coherence, semantics, usage habits, and probabilities of respective synonym phrases to uniquely determine the synonymous words of respective original words in the original sentence, and connecting the synonymous words of respective original words sequentially based on a connecting sequence of respective original words in the original sentence to obtain a final retold sentence corresponding to the original sentence; or connecting the selected synonymous words of respective original words sequentially based on a connecting sequence of respective original words in the original sentence to obtain a plurality of retold sentences of the original sentence, and calculating a comprehensive score for each of the plurality of retold sentences based on one or more of sentence coherence, semantics, usage habits, and probabilities of respective synonymous phrases to determine a unique retold sentence corresponding to the original sentence, wherein the synonymous word bank or the synonymous word determining model are established by determining word vector representations of respective words in a word bank; and obtaining synonymous words of respective words in the word bank based on semantic similarity between word vector representations of different words in the word bank, wherein the synonymous word determining model is established by inputting lots of common words to a neural network model in advance for training to determine the synonymous word determining model, and wherein the pre-set file for storing the probabilities of different words appearing continuously is obtained by:

determining vector representations of words contained in respective sample texts; and inputting the determined vector representations of the words contained in respective sample texts to a Long Short-Term Memory model for training, and outputting the probabilities of respective words appearing continuously and persistently storing them in the pre-set file.

2. The method according to claim 1, further comprising:

determining word vector representations of respective words in a word bank;

obtaining synonymous words of the respective words in the word bank based on cosine similarities or Euclidean distance between word vector representations of different words in the word bank.

3. A device for retelling a text, comprising:

a processor; and a memory, configured to store instructions executable by the processor, wherein the processor is configured to:

for each original sentence in an original text, performing processing on the original sentence to obtain respective original words contained in the original sentence, and inputting sequentially each original words into a synonymous word bank or a synonymous word determining model that has been established in advance, to obtain one or more synonymous word corresponding to each original word;

select a preset number of synonymous words from the one or more synonymous words corresponding to each original word based on predetermined probabilities of different words appearing continuously, comprising:

determining respective synonymous phrases consisting of current synonymous words for a current original word and following synonymous words for a following original word in the original sentence, the following original word referring to an original word following the current original word in the original sentence;

inputting sequentially the respective synonymous phrases to a pre-set file for storing the probabilities of different words appearing continuously, to determine a probability of the respective synonymous phrases, the probability of different words appearing continuously being a probability that two or more neighboring words occur simultaneously, the probability of different words appearing continuously being obtained by mass sample file statistics and persistently stored in the pre-set file, and the probability of the synonymous phrase referring to a probability that two or more synonymous words occur continuously;

selecting the preset number of synonymous phrases with higher probabilities, and excluding other synonymous phrases with lower probabilities;

taking an end original word in the following original words as a new current original word, and repeating the step of selecting the synonymous words for a new following original word of the new current original word, until the end of the original sentence, the end original word referring to a word belonging to the following original word and located at the end position of the following original word;

connect the synonymous phrases sequentially to obtain a retold sentences of the original sentence;

wherein connecting the selected synonymous phrases sequentially to obtain a retold sentence of the original sentence comprises:

performing an intersection operation on the selected synonymous words of respective original words based on one or more of sentence coherence, semantics, usage habits, and probabilities of respective synonym phrases to uniquely determine the synonymous words of respective original words in the original sentence, and connecting the synonymous words of respective original words sequentially based on a connecting sequence of respective original words in the original sentence to obtain a final retold sentence corresponding to the original sentence; or connecting the selected synonymous words of respective original words sequentially based on a connecting sequence of respective original words in the original sentence to obtain a plurality of retold sentences of the original sentence, and calculating a comprehensive score for each of the plurality of retold sentences based on one or more of sentence coherence, semantics, usage habits, and probabilities of respective synonymous phrases to determine a unique retold sentence having the highest score as a final retold sentence corresponding to the original sentence, wherein the synonymous word bank is established by
determining word vector representations of respective words in a word bank; and
obtaining synonymous words of respective words in the word bank based on semantic similarity between word vector representations of different words in the word bank, and wherein the synonymous word determining model is established by inputting lots of common words to a neural network model in advance for training to determine the synonymous word determining model, wherein the pre-set file for storing the probabilities of different words appearing continuously is obtained by
determining vector representations of words contained in respective sample texts; and
inputting the determined vector representations of the words contained in respective sample texts to a Long Short-Term Memory model for training, and outputting the probabilities of respective words appearing continuously and persistently storing them in the pre-set file.

4. The device according to claim 3, wherein the processor is further configured to:

determine word vector representations of respective words in a word bank;

obtain synonymous words of the respective words in the word bank based on cosine similarities or Euclidean distance between word vector representations of different words in the word bank.

5. A storage medium having a computer program stored thereon, wherein, the computer program is configured to implement a method for retelling a text when executed by a processor, the method comprising:

for each original sentence in an original text, performing processing on the original sentence to obtain respective original words contained in the original sentence, and inputting sequentially each original words into a synonymous word bank or a synonymous word determining model that has been established in advance, to obtain one or more synonymous words corresponding to each original word;

selecting a preset number of synonymous words the one or more synonymous word corresponding to each original word based on predetermined probabilities of different words appearing continuously, comprising:

determining respective synonymous phrases consisting of current synonymous words for a current original word and following synonymous words for a following original word in the original sentence, the following original word referring to an original word following the current original word in the original sentence;

inputting sequentially the respective synonymous phrases to a pre-set file for storing the probabilities of different words appearing continuously, to determine a probability of the respective synonymous phrases, the probability of different words appearing continuously being a probability that two or more neighboring words occur simultaneously, the probability of different words appearing continuously being obtained by mass sample file statistics and persistently stored in the pre-set file, and the probability of the synonymous phrase referring to a probability that two or more synonymous words occur continuously; and selecting the preset number of synonymous phrases with higher probabilities, and excluding other synonymous phrases with lower probabilities;

taking an end original word in the following original words as a new current original word, and repeating the step of selecting the synonymous words for a new following original word of the new current original word, until the end of the original sentence, the end original word referring to a word belonging to the following original word and located at the end position of the following original word;

connecting the selected synonymous phrases sequentially to obtain a retold sentence of the original sentence;

wherein connecting the selected synonymous phrases sequentially to obtain a retold sentence of the original sentence comprises:

performing an intersection operation on the selected synonymous words of respective original words based on one or more of sentence coherence, semantics, usage habits, and probabilities of respective synonym phrases to uniquely determine the synonymous words of respective original words in the original sentence, and connecting the synonymous words of respective original words sequentially based on a connecting sequence of respective original words in the original sentence to obtain a final retold sentence corresponding to the original sentence; or connecting the selected synonymous words of respective original words sequentially based on a connecting sequence of respective original words in the original sentence to obtain a plurality of retold sentences of the original sentence, and calculating a comprehensive score for each of the plurality of retold sentences based on one or more of sentence coherence, semantics, usage habits, and probabilities of respective synonymous phrases to determine a unique retold sentence corresponding to the original sentence, wherein the synonymous word bank or the synonymous word determining model are established by determining word vector representations of respective words in a word bank; and obtaining synonymous words of respective words in the word bank based on semantic similarity between word vector representations of different words in the word bank, wherein the synonymous word determining model is established by inputting lots of common words to a neural network model in advance for training to determine the synonymous word determining model, and wherein the pre-set file for storing the probabilities of different words appearing continuously is obtained by:

determining vector representations of words contained in respective sample texts; and inputting the determined vector representations of the words contained in respective sample texts to a Long Short-Term Memory model for training, and outputting the probabilities of respective words appearing continuously and persistently storing them in the pre-set file.

* * * * *